(12) United States Patent
Hamano et al.

(10) Patent No.: US 6,934,141 B2
(45) Date of Patent: Aug. 23, 2005

(54) POWER SUPPLY DEVICE PREVENTING INRUSH CURRENT

(75) Inventors: Yoshiomi Hamano, Yamatokoriyama (JP); Kiyoshi Inoue, Nara (JP); Junichi Kajiwara, Nara (JP); Takao Horiuchi, Nara (JP); Koichi Sumida, Tenri (JP); Akira Tamagaki, Nara (JP); Akihiko Taniguchi, Yamatokoriyama (JP); Hiroki Kai, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/421,693

(22) Filed: Apr. 24, 2003

(65) Prior Publication Data

US 2003/0202296 A1 Oct. 30, 2003

(30) Foreign Application Priority Data

Apr. 26, 2002 (JP) ....................................... 2002-126009

(51) Int. Cl.[7] .............................................. H01H 47/00
(52) U.S. Cl. ...................................... 361/160; 361/187
(58) Field of Search ................................. 361/160, 187, 361/189, 93.9, 28; 323/908

(56) References Cited

U.S. PATENT DOCUMENTS 4,967,100 A * 10/1990 Okutsu et al. .............. 327/111
5,926,010 A * 7/1999 Hosokawa et al. ......... 323/222
6,631,065 B2 * 10/2003 Sugiyama et al. .......... 361/100

FOREIGN PATENT DOCUMENTS

| JP | 6-231664 A | 8/1994 |
|----|-----------|--------|
| JP | 10-243555 A | 9/1998 |
| JP | 2000-253570 A | 9/2000 |
| JP | 2001-282059 A | 10/2001 |

* cited by examiner

Primary Examiner—Shawn Riley
(74) Attorney, Agent, or Firm—Birch, Stewart, Kolasch & Birch, LLP

(57) ABSTRACT

A power supply device 3 including: a current source 31 for supplying current to a load circuit 4 which operates on the supplied current, and a power switch unit 32 between the current source 31 and the load circuit 4 to control passage of current, wherein: the power switch unit 32 includes a switching element 323 connected in parallel with the open-close element 321, a power supply controller 33 including an open-close element controller 31 which controls operation of the open-close element 321 and a switching element controller 332 which controls operation of the switching element 323, and a voltage detector 34 which detects terminal voltage of the load circuit 4; and the power switch unit 32 turns on the switching element before supplying current to the load circuit and closes the open-close element when the terminal voltage of the load circuit becomes almost equal to supply voltage.

5 Claims, 8 Drawing Sheets

[WHEN ONLY LOAD 4-1 IS USED]

[WHEN LOADS 4-1 AND 4-2 ARE USED]

POWER SUPPLY DEVICE PREVENTING INRUSH CURRENT

BACKGROUND OF THE INVENTION

The present invention relates to a power supply circuit equipped with inrush current prevention means for lessening the effect of inrush current on contacts (switches) and installed between an input power supply, which is a power supply device, and internal circuits (load circuits) supplied with power.

DESCRIPTION OF THE RELATED ART

Image forming apparatuses such as copiers provided with electrophotographic processes are equipped with a heat fixing unit to fix toner images reproduced on the recording paper. The heat fixing unit generally incorporates a heat source such as a heater to control current conduction, through which current is passed to maintain a predetermined fixing temperature.

Configuration of a digital copier equipped with a power supply circuit and options will be described with reference to FIG. 7. The digital copier 1 comprises an automatic original feeder 112, original reader 110, image forming unit 210, fixing unit 217, transport means 250, duplex unit 255, post-processor 260, and multi-stage paper feeder 270.

On top of the digital copier 1 is a copy board 111 made of transparent glass, on which the automatic original feeder 112 (a peripheral device) is mounted. The automatic original feeder 112 automatically feeds originals placed on an original receiving tray to the copy board 111 sheet by sheet.

The original reader 110, which is placed underneath the copy board 111, scans and reads an original image positioned on the copy board 111. It comprises a first scanning unit 113, second scanning unit 114, optical lens 115, and CCD line sensor 116 which is a photoelectric conversion element. The first scanning unit 113 consists of an exposure lamp unit which exposes the surface of an original, a first mirror which reflects reflected light from the original in a predetermined direction, etc. The second scanning unit 114 consists of a second mirror and third mirror which lead the reflected light of the original coming from the first mirror to the CCD line sensor 116 which is a photoelectric conversion element. The optical lens 115 focuses the reflected light of the original on the CCD line sensor 116.

The original reader 110 reads the original image transported automatically by the automatic original feeder 112 at a predetermined exposure position in coordination with the automatic original feeder 112.

The original image read by the reader 110 is sent as image data to an image data input unit not shown. The image data undergoes predetermined image processing, stored temporarily in an image processor memory, read out of the memory in response to an output instruction, and transferred to a laser writing unit 227 which is an optical writer in the image forming unit 210.

The laser writing unit 227 consists of a semiconductor laser light source which emits laser light based on image data read out of the memory or transferred from an external device, polygon mirror which deflects laser light at uniform angular velocity, f-θ lens which corrects the laser light deflected at uniform angular velocity so that it will be deflected on a photoconductor drum 222 at uniform angular velocity, etc. Incidentally, although the laser writing unit is used as a writer in this embodiment, it is also possible to use an optical write head unit of a solid scanning type constructed from LED, EL, or other luminous element arrays.

Besides, around the photoconductor drum 222, the image forming unit 210 comprises an electrifier 223 which charges the photoconductor drum 222 to a predetermined potential, developing device 224 which develops an electrostatic latent image formed on the photoconductor drum 222 by supplying toner, transferring device (such as a transfer charger) 225 which transfers the electrostatic latent image formed on the surface of the photoconductor drum 222 to recording paper, cleaner 226 which recovers excess toner, and static eliminator (such as an antistatic charger) 229.

The recording paper to which the image is transferred in the image forming unit 210 is sent to the fixing unit 217 equipped with a heat source and the image is fixed on the recording paper.

In addition to the fixing unit 217, the image forming unit 210 comprises, on the output side, a switchback path 221 for turning back the recording paper to form an image again on the back side of the recording paper and the post-processor 260 which staples the recording paper after image formation and is equipped with an elevator tray 261. The recording paper on which the image is fixed by the fixing unit 217 is led to the post-processor 260 (a peripheral device) along the switchback path 221 by a paper feed roller 219, where, after a predetermined post-treatment, it is ejected.

The paper feeder is installed under the image forming unit 210. It comprises a manual feed tray 254, the duplex unit 255, and a paper tray 251 installed in the main body as well as a paper feed trays 252 and 253 installed in the multi-stage paper feeder (a peripheral device) 270. Also, the paper feeder comprises the transport means 250 which transports the paper from these trays 251, 252, 253, and 254 to a transfer position provided on the transferring device in the image forming unit 210. The duplex unit 255, which is connected to the switch back path 221 for reversing the recording paper, is used to form images on both sides of the recording paper. Incidentally, the duplex unit 255 is interchangeable with a normal paper cassette, and it is possible to adopt a configuration in which the duplex unit 255 is replaced by a normal paper cassette.

So far, description has been given of an image forming system consisting mainly of an image recorder (printer) and equipped with a plurality of peripheral devices. Although not described here, the system can be equipped with a combination of post-processing units such as a sorter and staple finisher and peripheral devices such as an automatic original feeder which supports two-sided originals, a multi-stage paper feed unit (three-stage, four-stage, etc.), a high capacity paper feed unit, and an image communications unit capable of image communications with external devices.

In that case, the digital copier 1 includes the reader 110, image forming unit 210, fixing unit 217, and transport means 250 in its basic configuration, and additionally includes the automatic original feeder 112, duplex unit 255, post-processor 260, and multi-stage paper feeder 270, etc. as peripheral devices (options).

Such a digital copier is provided with normal operation mode in which the main unit and peripheral devices are operating, standby mode in which only the main unit is ready to operate, and energy-saving standby (power-saving) mode in which feeding of standby power to large load circuits such as the fixing device is stopped.

If the equipment is not used for a predetermined period, it enters the energy-saving standby (low power) mode by automatically reducing power consumption.

Furthermore, with recent copiers, when shifting from normal standby mode into energy-saving standby mode, a CPU of a controller itself goes into hibernation for further power saving by operating only the part of circuits needed to return to normal standby mode.

To reduce power consumption, Japanese Patent Laid-Open No. 2001-282059 proposes a power supply circuit for an apparatus which has a plurality of operation modes including normal operation mode for normal copy/standby operations and energy-saving standby mode for waiting with reduced power consumption for an instruction to turn on main power, comprising a main power supply circuit which supplies power to various parts in normal copy mode and standby mode; and an auxiliary power supply circuit which supplies minimum power in energy-saving standby mode, wherein the main power supply circuit is turned off in the energy-saving standby mode by switching means which is provided to turn on/off the main power supply circuit.

However, when returning from the energy-saving standby mode to the normal standby mode under this environment, the moment the main power supply circuit is switched on, starting to supply power to loads, an overcurrent (inrush current) occurs due to load capacitance, causing significant damage to the contacts of the circuit switch and thus degrading the contacts (switch). The degradation may eventually result in breakage/fusion of the contacts (switch).

Thus, Japanese Patent Laid-Open No. 10-243555 or the like proposes an overcurrent protection circuit in which the main power supply circuit supplies current to load circuits stepwise. The proposed overcurrent protection circuit has a plurality of current-limiting resistors between an input power supply (battery) and internal circuits and varies resistance values stepwise by controlling switching elements connected in parallel with the current-limiting resistors, to prevent inrush current from flowing through the internal circuits.

Also, Japanese Patent Laid-Open No. 2000-253570 proposes an electric car which comprises a charge pump circuit consisting of FETs and mounted in parallel with relay contacts for conducting current to a motor and a protection circuit for protecting the motor from inrush current by controlling the current flowing to the motor.

On the other hand, with the recent trends to digitize copiers and combine various functions, multifunction models which incorporate printing, network printing, facsimile, Internet fax, and network scanning functions as well as copying functions have been put on the market. The introduction of multifunction models has made it possible to meet various market (user) demands and configure a system by combining necessary units according to the operating conditions at the installation site.

When configuring equipment with a combination of various units, the power supply must have sufficient capacity to accommodate individual units. Besides, such equipment has a plurality of power units, which are used selectively depending on the operation mode of the equipment to supply power according to the operation mode. However, the use of multiple power units naturally increases costs and inevitably makes the size of the equipment larger.

Also, saving the power consumption of equipment in the environment where so many peripheral devices are attached means that load size as well as inrush current at power-on vary with the operation mode.

Looking at the prior art technologies in view of the above circumstances, although the technology described in Japanese Patent Laid-Open No. 10-243555 uses a plurality of resistors to protect load circuits from inrush current in a stepwise manner, it must change circuits each time the addition of an option or the like causes load changes. Besides, it does not give any consideration to changes in load capacity. Also, Japanese Patent Laid-Open No. 2000-253570 makes no mention of variable control over switching elements to accommodate changes in load capacity. Besides, this prior art technology relates to an electric car and provides a circuit which supplies power to the electric car alone, and is not a power supply device for equipment configuration consisting of a combination of units as with the present invention.

Recent image forming apparatus are proposed as convenient systems equipped with a variety of functions and optional devices (peripheral devices). However, to implement an energy-saving power supply system, it is necessary to give consideration to a variety of peripheral devices.

Image forming apparatus, such as electrophotographic copiers, with a heat source (especially, a fixing unit) are provided with normal operation mode for making copies, normal standby mode, energy-saving standby mode which is entered for low power consumption if no image is formed for a long period, and sleep mode which reduces power consumption as close to zero as possible.

In the energy-saving mode, the apparatus are configured to minimize power consumption from the standpoint of energy saving. For example, products have been commercialized which achieve low power consumption using a power supply device for energy-saving mode in addition to a power supply device for normal operation mode.

However, mounting a power supply device for energy-saving mode and power supply device for normal operation mode separately raises the problems of increased costs and larger equipment size.

Circuit configuration of the main unit of a conventional copier will be described with reference to a block diagram in FIG. 8. A circuit 3 of the copier comprises a main power unit 31, a control substrate 35, a sub-power unit 37, and load circuits 4-1, 4-2, 4-3, . . . , and 4-n.

The main power unit 31 is used for the operation of the main unit. The control substrate 35 holds a circuit for controlling copy operations carried out by the main unit. The sub-power unit 37 outputs the minimum necessary power in the energy-saving standby mode. The load circuits 4-1, 4-2, 4-3, . . . , and 4-n are motor or similar loads in optional devices attached to the main unit of the copier. Since a system is configured using a combination of options to suit the needs of the user, various combinations of loads are conceivable. Thus, various load devices are conceivable as well.

The main power unit 31, which is used during normal copy operations and during standby, supplies power for controlling the main unit and power for driving optional devices. The sub-power unit 37, which is used in the energy-saving standby mode, supplies power to the minimum necessary loads driven in the energy-saving mode.

Conventionally, since a copier performs multiple patterns of operation, a plurality of power units with more or less different configurations are used selectively to reduce standby power consumption from the standpoint of energy saving while supplying the minimum power necessary for control. Consequently, the number of power units increases to accommodate different loads, presenting such problems to be solved as increased product costs, larger power units which in turn make the main unit of the copier larger, increased weight, and increased transportation costs.

SUMMARY OF THE INVENTION

In view of the conventional problems, the object of the present invention is to provide a power supply device for a plurality of loads, which can reduce inrush current when shifting from energy-saving standby mode to normal standby mode and accommodate two modes—low-power mode such as energy-saving standby mode and high-power mode such as normal operation mode—with a single power supply circuit.

In other words, the object of the present invention is to provide a power supply device which can reduce inrush current when shifting from energy-saving standby mode to normal operation mode or normal standby mode in response to changes in current capacity or capacitance caused by addition of a load circuit such as installation of an option on the secondary side and reduce damage to contacts of open-close elements consisting of relay contacts and the like.

To achieve the above object, the present invention provides a power supply device, comprising: a current source for supplying current to a load circuit which operates on the supplied current; and an open-close element such as a relay contact between the current source and the load circuit to control passage of current, wherein a switching element such as a FET (field effect transistor) is connected in parallel with the open-close element; and the switching element is duty-controlled.

The duty control of the switching element involves adjusting the ON duty ratio of the switching element in response to changes in the load capacity of the load circuit and supplying a signal with a wider pulse width than original pulse width when the potential in the load circuit is stabilized. Besides, the switching element remains ON for a predetermined period after power is started to be supplied to the load circuit which causes the open-close element to be closed.

To achieve the above object, the present invention provides a power supply device, comprising: a current source for supplying current to a load circuit which operates on the supplied current, and a power switch unit between the current source and the load circuit to control passage of current, wherein: the power switch unit comprises an open-close element such as a relay contact and a switching element such as a FET connected in parallel with each other, a power supply controller comprising an open-close element controller which controls operation of the open-close element and a switching element controller which controls operation of the switching element, and a voltage detector which detects terminal voltage of the load circuit; and the power switch unit turns on the switching element before supplying current to the load circuit and closes the open-close element when the terminal voltage of the load circuit becomes almost equal to supply voltage.

BRIEF DESCRIPTION OF THE DRAWINGS

FIG. 4 is a diagram illustrating a current waveform at power-on;

DETAILED DESCRIPTION OF THE PREFERRED EMBODIMENTS

The present invention answers energy savings demands of information processing equipment and the like. It is distinguished for the way it controls a power supply circuit when supplying power to load circuits after getting out of energy-saving standby mode, for example, in a copier which has a normal copy mode, a standby mode, and an energy-saving standby mode which is entered if the operator performs no operation for a certain period.

Figure 1:
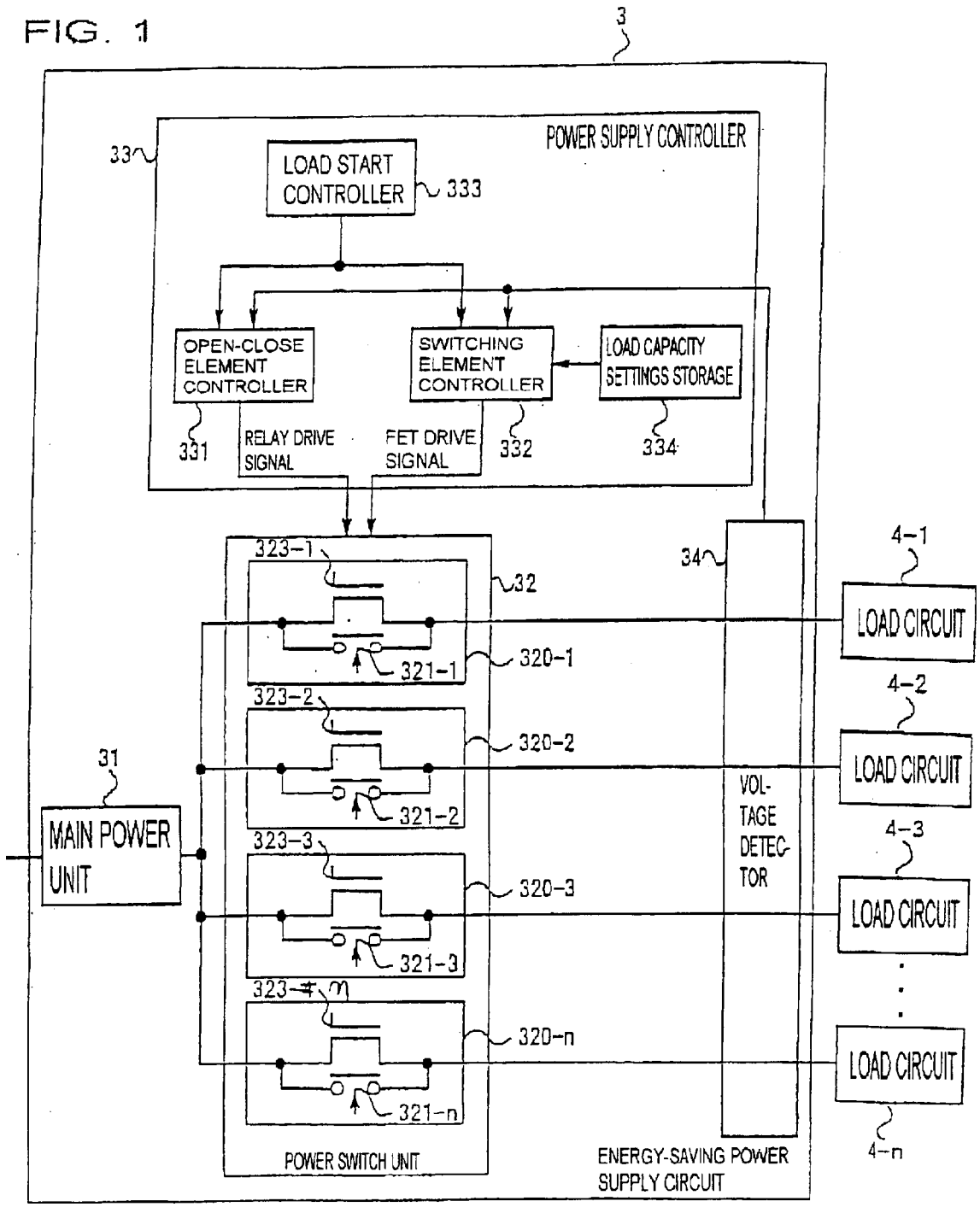
FIG. 1 is a functional block diagram illustrating functional configuration of an energy-saving power supply circuit according to the present invention.

Functional configuration of a power supply device according to the present invention will be described with reference to FIG. 1. The power supply device (energy-saving power supply circuit) 3 according to the present invention comprises a main power unit 31, power switch unit 32, power supply controller 33, and voltage detector 34. Output from the power switch unit 32 is supplied to load circuits 4-1 to 4-n.

The main power unit 31 is configured as a normal power unit for supplying power to the main unit of equipment and peripheral devices and has capacity to supply power at least to the main unit and all the peripheral devices which operate together with the main unit. The main power unit 31 may be configured as a block which can be added to form a larger power unit when peripheral devices are added.

The power switch unit 32 serves as switching means which opens and closes channels of power supply to load circuits. For example, a plurality of switching means 320 each consisting of an open-close element 321 such as a relay contact and switching element 323 such as a FET (field effect transistor) connected in parallel with each other are installed in parallel for the load circuits 4-1 to 4-n.

The power supply controller 33 serves as means of controlling the operation of the open-close element 321 and switching element 323 which compose the switching means 320, based on a load start command. The power supply controller 33 comprises an open-close element controller 331, switching element controller 332, load start controller 333, and load capacity settings storage 334.

The open-close element controller 331 serves as means of performing control so that the appropriate open-close elements (out of 321-1 to 321-n) will be closed when the terminal voltage of load circuits specified (from among 4-1 to 4-n) by a start command from the load start controller 333 reaches a predetermined value.

The switching element controller 332 has a capability to generate width-variable pulses. It serves as means of performing control so that the switching elements (out of 323-1 to 323-n) corresponding to the load circuits (from among 4-1 to 4-n) specified by a start command from the load start controller 333 will be turned on with a predetermined pulse width and that switching elements will be turned on with a larger pulse width when the terminal voltage of corresponding load circuits (from among 4-1 to 4-n) reaches a predetermined value. The switching element controller 332 sets the pulse widths according to load capacities which have been set in the load capacity settings storage 334.

The open-close element controller 331 and switching element controller 332 operate such that the open-close elements 321 will be closed when the switching elements 323 are ON.

The load start controller 333 generates a load start command to start predetermined loads, when the equipment starts up. Also, if a command to use equipment functions is issued when the equipment is in energy-saving standby mode, it issues a load start command to operate predetermined switching means 320-1 to 320-n.

The load capacity settings storage 334 serves as means of storing the capacities of the load circuits 4-1 to 4-n. The capacity of the main unit is set at the factory while the capacities of peripheral devices are set when they are added.

The voltage detector 34 serves as means of detecting the output voltages of the switching means 320 in the power switch unit 32, i.e., the terminal voltages of the load circuits 4-1 to 4-n.

Figure 2:
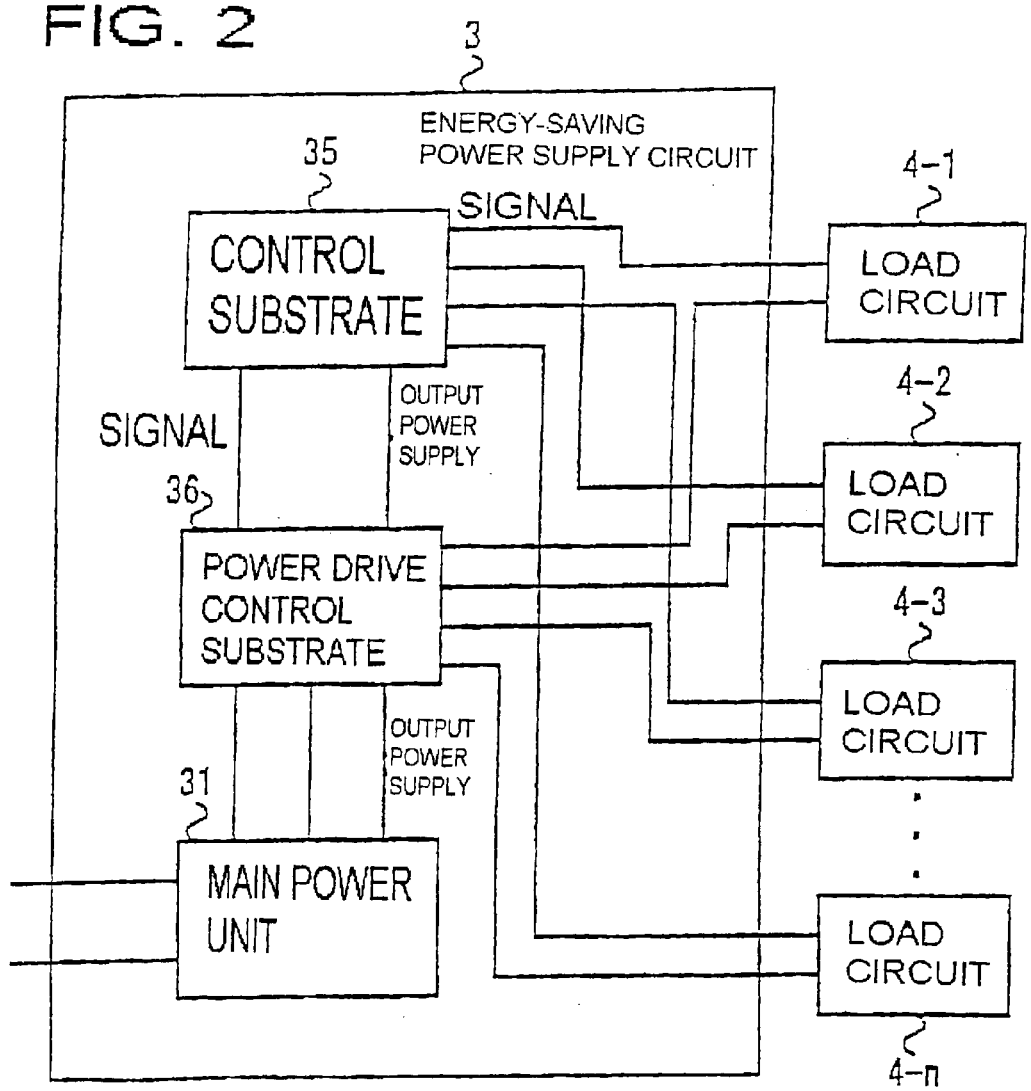
FIG. 2 is a block diagram illustrating hardware configuration of the energy-saving power supply circuit according to the present invention.
Figure 3:
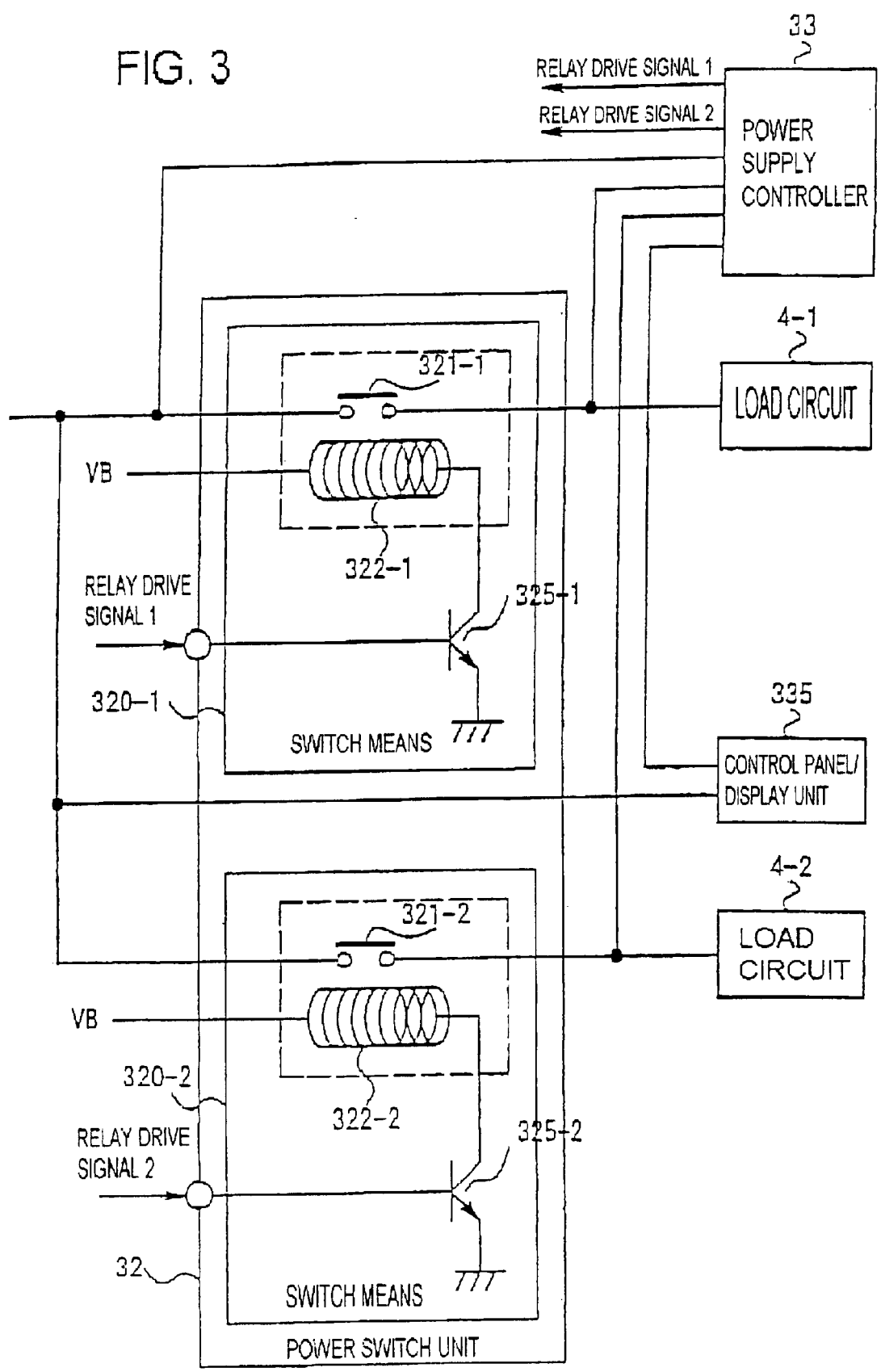
FIG. 3 is a diagram illustrating configuration of a power switch unit according to the present invention.
Figure 5:
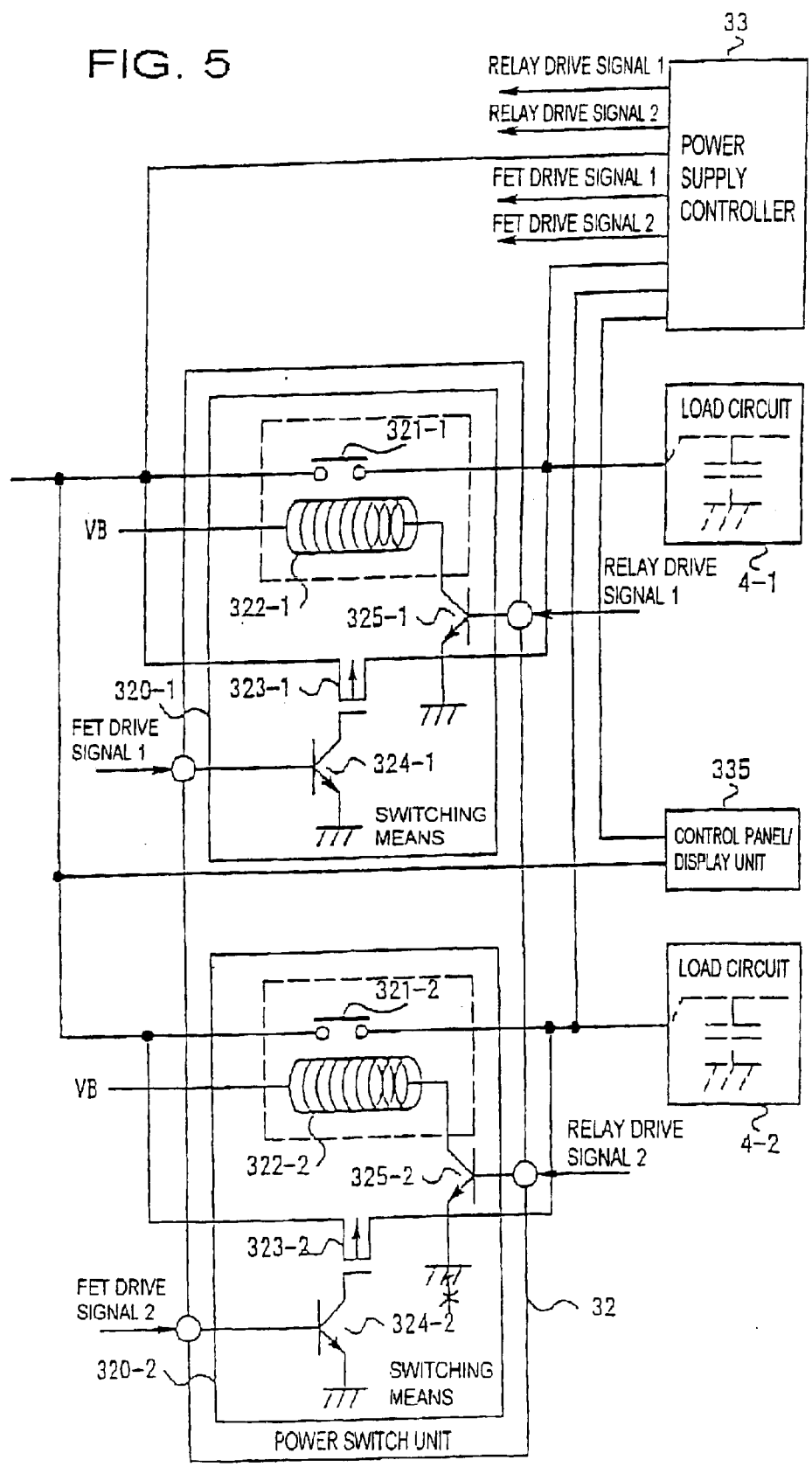
FIG. 5 is a diagram illustrating configuration of the power switch unit according to the present invention configured to prevent inrush current.
Figure 8:
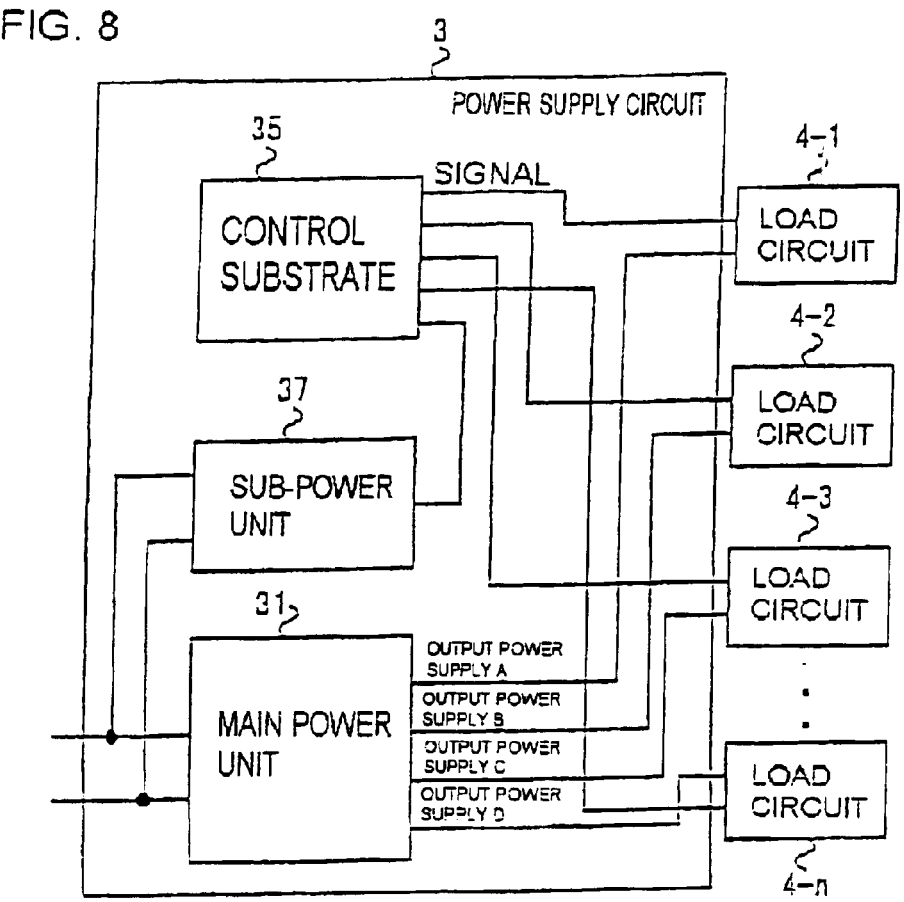
FIG. 8 is a block diagram illustrating hardware configuration of a conventional power supply circuit.

Hardware configuration of the energy-saving power supply circuit according to the present invention will be described with reference to the block diagram in FIG. 2. The energy-saving power supply circuit 3 according to the present invention comprises the main power unit 31; a control substrate 35; a power drive control substrate 36; and the load circuits 4-1, 4-2, 4-3, and 4-n. The energy-saving power supply circuit 3 according to the present invention differs from the conventional power supply circuit shown in FIG. 8 in that the control substrate 35 contains the power supply controller 33 and that the sub-power unit 37 is replaced by the power drive control substrate 36 on which the power switch unit 32 and voltage detector 34 are mounted. Detailed circuit diagrams of the power switch unit 32 mounted on the power drive control substrate 36 are shown in FIGS. 3 and 5.

Concrete configuration and basic operation of the energy-saving power supply circuit 3 according to the present invention will be described with reference to FIG. 3. The power switch unit 32 mounted on the power drive control substrate 36 has a plurality of the switching means 320-1 and 320-2 (two in this example). Each of the switching means 320 comprises the open-close element 321 (which is a relay contact) relay winding 322, and relay drive transistor 325. During normal copy operation and standby, the energy-saving power supply circuit 3 provides a power environment in which the components composing the system can operate: sets a relay drive signal to "H" to turn on the relay drive transistor 325 and thereby supply power to the relay winding 322 and turns on the open-close element 321 to supply power to the load circuit 4 from the main power unit 31.

On the other hand, in energy-saving standby mode, the energy-saving power supply circuit 3 supplies power selectively to the minimum loads necessary for the system: sets the relay drive signal to "L" to open the open-close elements 321 selectively and thereby shut off power supply from the main power unit 31.

A control panel/display unit 335 serves as means for giving operating instructions to the system and has the display capability of informing the operator of system status. The power constantly supplied to the control panel/display unit 335 is drawn from upstream of the relay contacts 321. The power supply controller 33 mounted on the control substrate 35 and the control panel/display unit 335 are kept ready to communicate with each other to allow the operator to give new operating instructions to the system from status display.

The basic operation of the energy-saving power supply circuit 3 has been described so far. Potential problems with the switching means 320 configured as described above include the possibility that the relay contacts 321 may get fused the moment the relay contacts 321 are closed, i.e., upon return from energy-saving standby mode to normal operation mode, due to large momentary inrush current to load circuits 4 because of the capacitance and wiring impedance of the load circuits 4 connected downstream of the relay contacts 321. Thus, it is quite conceivable that the fused contacts could not be released or the power could not be switched off, resulting in breakage of system components or an accident in the worst case.

The capacity of the load circuit 4 varies with the size of load placed on the copier, i.e., the combination of options attached to the copier and thus inrush current of some magnitude will occur without fail.

Figure 4:
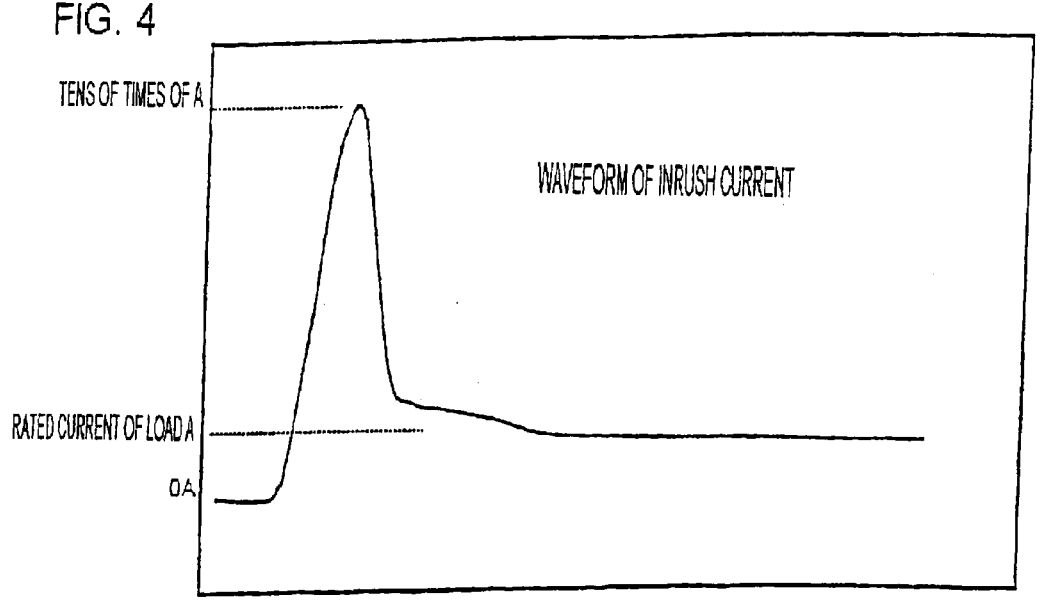

Waveforms of inrush current will be described with reference to FIG. 4. The figure shows a waveform of inrush current with the vertical axis representing current value and the horizontal axis representing time. As shown in the figure, inrush current tens of times larger than the rated current of the load circuit occurs at power-on. Besides, the inrush current changes its waveform with changes in the load. Thus, it is conceivable to set the current capacity of the relay contacts 321 in advance according to the loads on the units composing the system and to the inrush current involved, but it is questionable from the viewpoint of the cost and size of the power unit to provide a plurality of relay contacts with different current capacities for peripheral devices which can be incorporated into the system.

To solve this problem, the present invention configures the power switch unit 32 mounted on the power drive control substrate 36 as shown in FIG. 5. Specifically, the power switch unit 32 has the switching means 320-1 and 320-2 for individual loads. Each of the switching means 320 has the open-close element 321 which is a relay contact, the relay winding 322, the switching element (FET) 323 connected in parallel with the open-close element 321, a FET drive transistor 324, and the relay drive transistor 325.

The FET drive transistor 324 is connected between the gate of the FET and ground while its base is fed a FET drive signal outputted from the switching element controller 332. The relay drive transistor 325 is connected between the relay winding 322 and ground while its base is fed a relay drive signal outputted from the open-close element controller 331.

Before the relay contact 321 is closed, the FET 323 is turned on selectively at the appropriate time according to the level of the load circuit 4 to recharge the capacitor of the load circuit 4 by applying voltage. The relay contact 321 is closed after the capacitor is charged to some extent to protect the relay contact 321 and the load circuit 4 from inrush current. At a predetermined time after the relay contact 321 is closed, the FET 323 is turned off.

The use of this circuit arrangement and control makes it possible to pass current which will not cause stress to the relay contacts 321 or load circuits 4, almost eliminating damage to the contacts and damage caused at start-up and assuring the operational reliability of the units composing the system.

By controlling the pulse widths of gate signals supplied to the FET drive transistors 324, the output (output from the drain terminal) voltage of the FETs 323 is increased gradually. Specifically, when the bases of the FET drive transistors 324-1 and 324-2 are pulsed on and off by FET drive signals 1 and 2 with a predetermined pulse width sent to the FET drive transistors 324-1 and 324-2, the gates of the FETs 323-1 and 323-2 are also pulsed on and off. Consequently, the source and drain of each of the FETs 323-1 and 323-2 are also connected and disconnected, accumulating some charge in the load circuits 4. When the output voltage of the switching means 320, i.e., terminal voltage of the load circuits 4 reaches a predetermined value, the system is eventually operated at a duty ratio of 100% and the source and drain of the FETs 323-1 and 323-2 are connected. As a result, charge is accumulated in the load circuits 4. Then, the relay contacts 321-1 and 321-2 are closed to supply power smoothly to the load circuits 4-1 and 4-2. The relay contacts 321 are closed and when chattering and the like are eliminated, the FETs 323 are turned off.

The above operation protects the relay contacts 321 from inrush current and allows the FETs 323 themselves to avoid stress caused by the inrush current.

Since the pulse widths of the FET drive signals (gate signals 1 and 2) supplied to the FET drive transistors 324-1 and 324-2 can be controlled according to loads, even if there are a plurality of peripheral devices which require various amounts of power and a system is composed of some of the peripheral devices, it is possible to provide the appropriate operating environment by simply controlling the pulse width of the FET drive signals (gate signals 1 and 2) according to what peripheral devices are mounted.

In actual operation, by controlling the pulse widths of the FET drive signals 1 and 2 in such a way as to vary the duty ratio according to the size of the load circuits 4-1 and 4-2 (options) attached to the equipment, it is possible to turn on the FETs 323 optimally.

Figure 6:
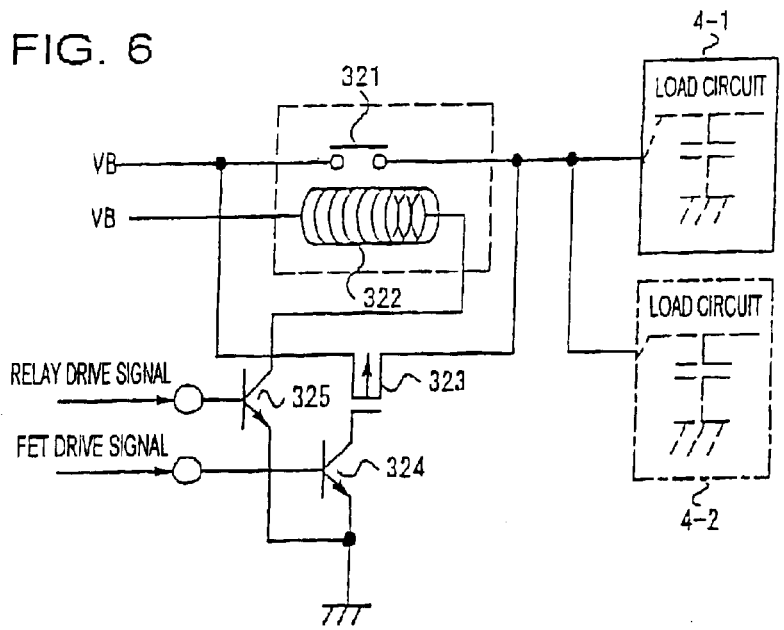
FIG. 6 is a diagram illustrating operation of a power supply device according to the present invention.
Figure 6:
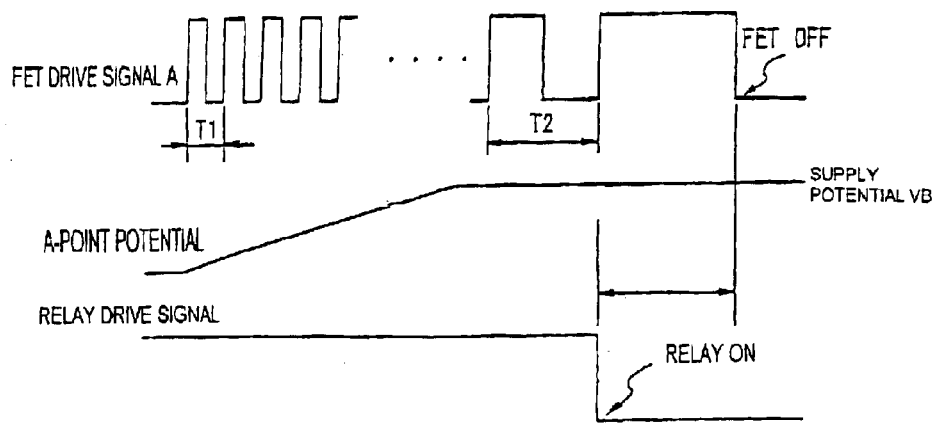
Figure 6:
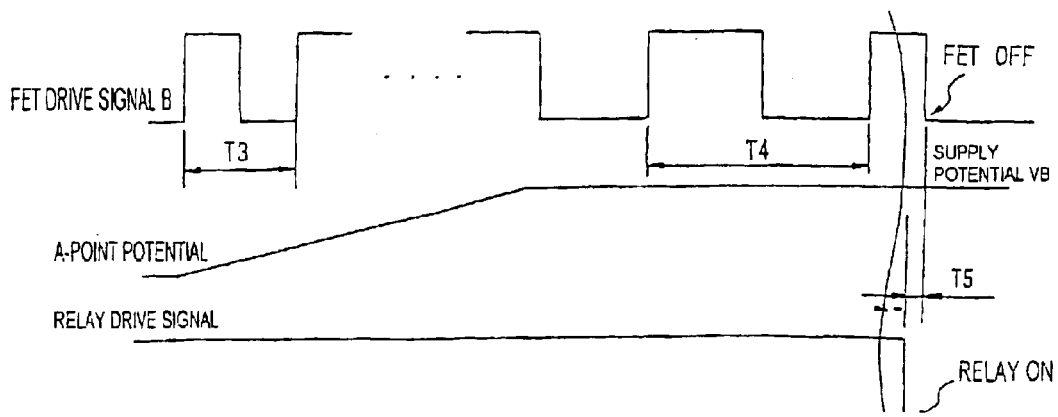
Figure 7:
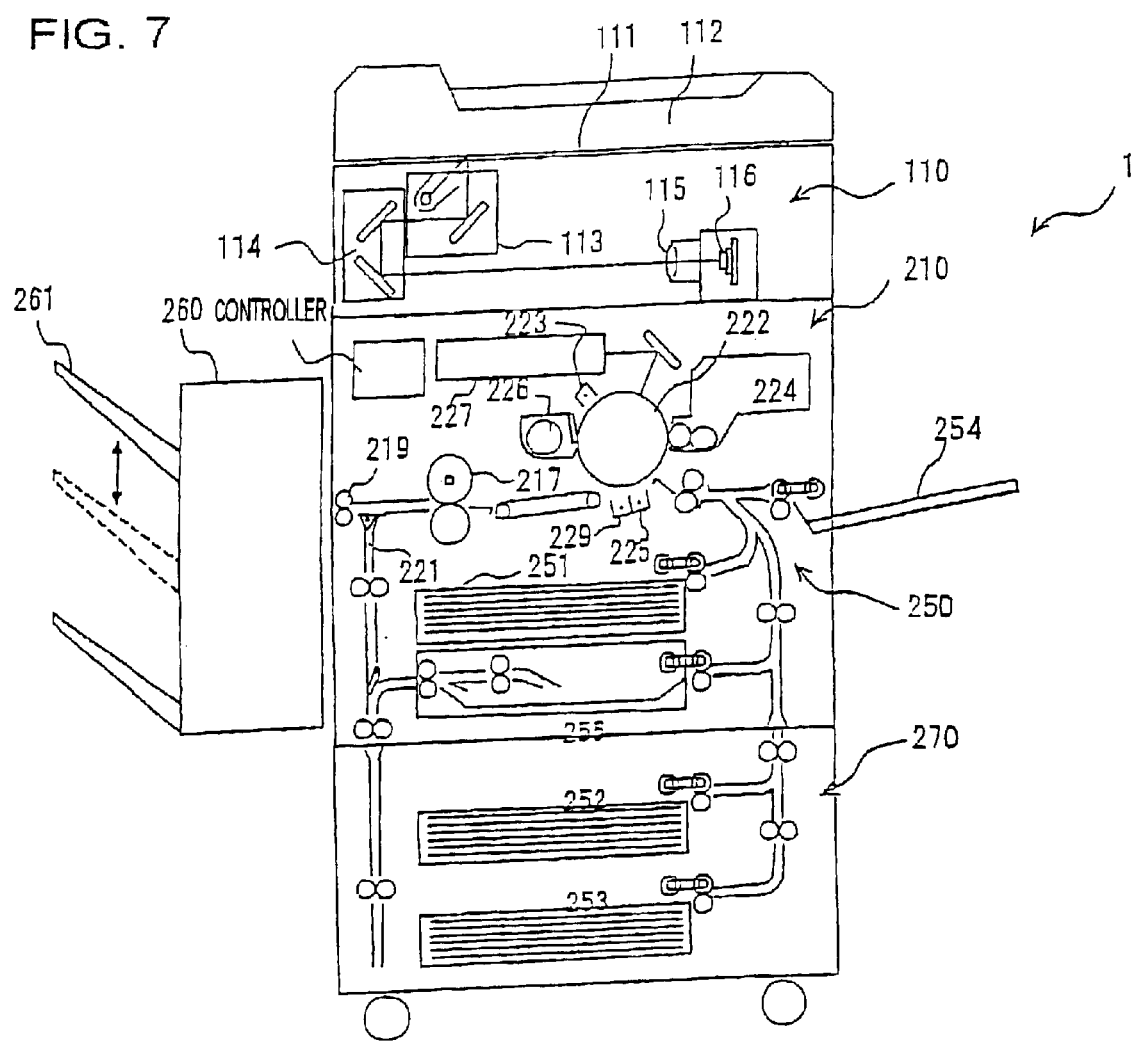
FIG. 7 is a diagram illustrating configuration of a digital copier to which the present invention is applied.

FIG. 6 shows examples of relationship between duty ratios for pulse width control of gate signals and source-drain voltage waveforms of the FETs 323 using various combinations of the load circuits 4-1 and 4-2 described above.

EXAMPLE 1

When only the load circuit 4-1 is connected

Before the load circuit 4-1 is operated, a pulse signal (FET drive signal A) is supplied to the FET drive transistor 324. The FET drive signal A supplied to the FET drive transistor 324 is set to the capacity of the load circuit 4-1 alone. When the capacity of the load circuit 4-1 supplied in advance is small, the pulse period of the FET drive signal A with a duty ratio of 0.5 (ON time/(ON time+OFF time)) is controlled variably from a relatively short period (period T1) to a relatively long period (period T2). Consequently, inrush current to the capacitor of the load circuit 4-1 increases gradually and charge is accumulated gradually in the capacitor of the load circuit 4-1 as the current increases. Changes at point A in the capacitor of the load circuit 4-1 are indicated as A-point potential in the figure. When the A-point potential becomes equal to the supply potential VB of the power supply, a pulse signal with a higher duty ratio than the initial duty ratio can be supplied to the FET drive transistor 324 to stabilize the potential at point A.

When the voltage at point A in the load circuit 4-1 becomes equal to the supply potential VB, a relay drive signal is supplied to the base of the relay drive transistor 325 to close the relay contact 321 and thereby activate the load circuit 4-1. The closed state of the relay contact 321 becomes unstable first (instantaneously) due to chattering and the like. Thus, if the FET 323 is OFF, the FET 323 is turned ON and if the FET 323 is ON, it is kept ON. This ensures stable power supply to the load circuit 4-1 without being affected by chattering of the relay contact 321 or the like.

EXAMPLE 2

When the load circuit 4-1 and load circuit 4-2 are connected

As is the case with the operation of the load circuit 4-1 alone, before the load circuit 4-1 and load circuit 4-2 are operated, a pulsed FET drive signal B is supplied to the FET drive transistor 324. Since the pulse width of the FET drive signal B supplied to the FET drive transistor 324 is adjusted to the load capacity of the load circuit 4-1 and load circuit 4-2, a relatively wider pulse signal than in the stand-alone operation is supplied stepwise. Consequently, charge is accumulated gradually in the capacitors of the load circuits 4-1 and 4-2. It takes slightly longer time than in the stand-alone operation for the potential at point A (indicated as the A-point potential in the figure) to equal the supply potential VB of the power supply because of the larger load capacity. By that time, a wider pulse signal than the original pulse signal is supplied to the FET drive transistor 324 to stabilize the potential at point A. Again, wider pulses are supplied according to the load capacity to stabilize the potential reliably.

In this state, a relay drive signal is supplied to close the relay contact 321 and thereby activate the load circuits 4-1 and 4-2. The closed state of the relay contact 321 becomes unstable first (instantaneously) due to chattering and the like. Thus, if the FET 323 is OFF, the FET 323 is turned ON and if the FET 323 is ON, it is kept ON. This ensures stable power supply to larger loads than in the stand-alone operation.

Thus, the present invention has achieved cost reduction and downsizing of the entire equipment by employing controlling power supply using an ON/OFF control circuit with relay contacts instead of using a sub-power supply. As a method of supplying power, by installing FETs in parallel with the relay contacts, the present invention prevents inrush current from flowing through the relay contacts and load devices and thereby improves the operational reliability of the equipment. Furthermore, the present invention assures the reliability of the FETs themselves by duty-controlling the operation of the FETs and supplies optimum power by varying the duty ratio in response to changes in load capacity.

In a power supply device comprising a current source for supplying current to a load circuit which operates on the supplied current, and an open-close element between the current source and the load circuit to control passage of current, by installing a switching element in parallel with the open-close element, the present invention prevents degradation or breakage of the open-close element due to inrush current which can occur when current is started to be supplied to the load, expands the life of the open-close element, and ensures proper operation. Consequently, the present invention ensures stable power supply to the load circuit and stable operation of the load.

In a power supply device comprising a current source for supplying current to a load circuit which operates on the supplied current, and an open-close element such as a relay contact between the current source and the load circuit to control passage of current, by installing a switching element in parallel with the open-close element, in a simple construction, the present invention can eliminate inrush current which can occur when current is started to be supplied to the load, prevent degradation or breakage of the open-close element, expands the life of the contact of the open-close element, and ensures stable power supply to the load.

In the power supply device described above, by duty-controlling the switching element, the present invention allows the duty of the operation signal supplied to the switching element to be set according to the amount of inrush current expected to occur when the open-close element is closed. Thus, it can operate the switching element according to load and ensure satisfactory life and stable operation of the open-close element. Also, by adjusting the ON duty ratio of the switching element in response to changes in the load capacity of the load circuit, the present invention can set the duty of the operation signal supplied to the switching element according to the level of the inrush current which occurs when the open-close element is closed and varies with the configuration of the load circuit. Thus, it can operate the switching element according to load and ensure satisfactory life and stable operation of the open-close element. Furthermore, a signal with a larger pulse width than the original pulse width is supplied to the switching element when the potential in the load circuit stabilizes. Consequently, by the time the potential in the load circuit becomes equal to the supply potential of the power supply, a wider pulse signal than the original pulse signal is supplied to the transistor to stabilize the potential in the load circuit. This ensures stable power supply at power-on and stabilizes the operation of the equipment. In addition, the switching element is operated for a predetermined period after power is started to be supplied to the load circuit, to deal with the situation in which the operation of the relay contact becomes unstable first (instantaneously) when it is closed, as follows: if the FET is OFF, the FET is turned ON, and if the FET is ON, it is kept ON. This ensures stable power supply at power-on and stabilizes the operation of the equipment.

What is claimed is:

1. A power supply device, comprising:
   a current source for supplying current to a load circuit which operates on the supplied current;
   an open-close element between the current source and the load circuit to control passage of current; and
   a switching element connected in parallel with the open-close element, the switching element is duty-controlled, the ON duty ratio of the switching element is adjusted in response to a change in load capacity of the load circuit, wherein
   a control signal with a wider pulse width than original pulse width is supplied to the switching element when potential in the load circuit stabilizes.

2. A power supply device, comprising:
   a current source for supplying current to a load circuit which operates on the supplied current;
   an open-close element consisting of a relay contact between the current source and the load circuit to control passage of current; and
   a switching element consisting of a FET connected in parallel with the open-close element, the switching element is duty-controlled, the ON duty ratio of the switching element is adjusted in response to a change in load capacity of the load circuit, wherein
   a control signal with a wider pulse width than original pulse width is supplied to the switching element when potential in the load circuit stabilizes.

3. The power supply device according to claim 1, wherein the switching element is operated for a predetermined period after power is started to be supplied to the load circuit.

4. The power supply device according to claim 2, wherein the switching element is operated for a predetermined period after power is started to be supplied to the load circuit.

5. A power supply device, comprising:
   a current source for supplying current to a load circuit which operates on the supplied current;
   a power switch unit between the current source and the load circuit to control passage of current,
     the power switch unit comprises an open-close element and a switching element connected in parallel with each other, the switching element is duty-controlled, the ON duty ratio of the switching element is adjusted in response to a change in load capacity of the load circuit;
   a power supply controller comprising an open-close element controller which controls operation of the open-close element and a switching element controller which controls operation of the switching element; and
   a voltage detector which detects terminal voltage of the load circuit; wherein
   the power switch unit turns on the switching element before supplying current to the load circuit and closes the open-close element when the terminal voltage of the load circuit becomes almost equal to supply voltage.

* * * * *